(12) United States Patent
Shimizu

(10) Patent No.: US 6,999,201 B1
(45) Date of Patent: Feb. 14, 2006

(54) DIFFUSION METHOD USING ADAPTATION OF DIFFUSION RATIO AND AN APPARATUS THEREFOR

(75) Inventor: Junya Shimizu, Kawasaki (JP)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/572,578

(22) Filed: May 17, 2000

(30) Foreign Application Priority Data

May 18, 1999 (JP) ................................. 11-137294

(51) Int. Cl.
*H04N 1/405* (2006.01)
(52) U.S. Cl. ..................................... 358/3.04; 382/252
(58) Field of Classification Search ................ 358/447, 358/3.03, 3.04, 3.05; 382/237, 270, 271, 382/272, 273, 252, 251
See application file for complete search history.

(56) References Cited

U.S. PATENT DOCUMENTS

| | | | | |
|---|---|---|---|---|
| 4,878,125 A | * | 10/1989 | Katayama et al. | 358/3.03 |
| 5,757,517 A | * | 5/1998 | Couwenhoven et al. | 358/463 |
| 5,931,960 A | * | 8/1999 | Kletter et al. | 714/704 |
| 6,563,957 B1 | * | 5/2003 | Li et al. | 382/252 |
| 6,771,832 B1 | * | 8/2004 | Naito et al. | 382/252 |
| 2001/0015816 A1 | * | 8/2001 | Metcalfe | 358/1.9 |

FOREIGN PATENT DOCUMENTS

| | | |
|---|---|---|
| JP | 03-186063 | 8/1991 |
| JP | 03-186064 | 8/1991 |
| JP | 08-279906 | 10/1996 |
| JP | 09069942 A | * 3/1997 |

OTHER PUBLICATIONS

Ping Wah Wong, "Adaptive Error Diffusion and Its Application in Multiresolution Reading", *IEEE Transactions On Image Processing*, vol. 5, No. 7, Jul. 1996.

Stefan Thurnhofer and Sanjit K. Mitra, "A General Framework for Quadratic Volterra Filters for Edge Enhancement", *IEEE Transactions on Image Processing*, vol. 5, No. 6, Jun. 1996.

Lale Akarun, Yasemin Yardimci and A. Enis Cetin, "Adaptive Methods for Dithering Color Images", *IEEE Transactions on Image Processing*, vol. 6, No. 7, Jul. 1997.

Jill R. Goldschneider and Eve A. Riskin and Ping Wah Wong, "Embedded Color Error Diffusion", 565-568.

Gaurav Sharma and H. Joel Trussell, "Digital Color Imaging", *IEEE Transactions on Image Processing*, vol. 6, No. 7, Jul. 1997.

* cited by examiner

*Primary Examiner*—Scott A. Rogers
(74) *Attorney, Agent, or Firm*—Law Office of Charles W. Peterson, Jr.; Louis P. Herzberg

(57) ABSTRACT

According to the embodiment of the present invention, provided is an image error diffusion method for changing, an error diffusion ratio relative to the each pixel of an image. Further, according to another embodiment of the present invention, in order to generate a half tone image that highly correlates with an original image without losing the characteristics of the image, first, the characteristics of the input image are extracted, and then, the obtained results and input/output information are used to adjust, for each pixel, the diffusion state of a quantization error.

21 Claims, 13 Drawing Sheets

DIFFUSION METHOD USING ADAPTATION OF DIFFUSION RATIO AND AN APPARATUS THEREFOR

BACKGROUND OF THE INVENTION

1. Field of the Invention

The present invention relates to a computer system for image processing, and relates in particular to a halftoning method and apparatus.

2. Background Description

As is shown in FIG. 1, according to a general and conventional error diffusion method, or an error distribution method, a quantization error occurring at a currently processed pixel is diffused throughout an area in its vicinity. As a result of this diffusion, a display error is reduced to generate a half tone image, where the half tone image is an image that has smaller tone levels for pixels than the original image.

In FIG. 1, assume that an input image is denoted by $x(n_1,n_2)$ 105 and an output image is denoted by $y(n_1,n_2)$ 125, and that the input image is obtained by raster scanning N1×N2 pixels. In this case, $0 \leq n_1 \leq N1$ and $0 \leq n_2 \leq N2$.

In FIG. 1, blocks 110 and 140 are adders, a block 120 is a quantizer, and a block 130 is an error diffusion filter.

A two-dimensional low-pass filter having causality is used as the filter $g(n_1,n_2)$ 130 that diffuses a quantization error $e(n_1,n_2)$ 145, and is represented by, for example, the following expression:

$$g(n_1, n_2) = \begin{bmatrix} 0 & 0 & 0 & 0 & 0 \\ 0 & 0 & 0 & 0 & 0 \\ 0 & 0 & 0 & 7 & 5 \\ 3 & 5 & 7 & 5 & 3 \\ 1 & 3 & 5 & 3 & 1 \end{bmatrix} \cdot \frac{1}{48}$$

In the above expression, the element (3,3) (the center element in a 5×5 matrix) corresponds to a pixel currently being processed. Using the common error diffusion method, however, when a quantization error is diffused by the filter, the characteristics of an image, such as a sharp change portion of pixel values, may be lost.

The employment of a halftoning image is especially effective for a display method on a device having a small display area, such as a wearable clock type system, a PDA or a portable telephone, or, for a display method during a shifting period in which data must be sequentially transmitted to an LCD for an image having a definition of QXGA (2048×1536) or higher because collective transmission is difficult for such high definition LCDs. However, when the common error diffusion method is used to transform an image to a half tone, important characteristics of an image, such as the image edges, are lost, and for a conventional improved method, an enormous number of calculations is required to prevent such deterioration. Therefore, for the above described application examples, it is difficult to use conventional methods.

In order to cope with the loss of image characteristics, a method [1] proposed by Couwenhoven, et. al. (U.S. Pat. No. 5,757,517, "Adaptive error diffusion method." May 26, 1998 (filed on Mar. 23, 1995)), provides for an error diffusion ratio to be changed based on extracted characteristic information only, such as a high frequency component of the original image.

According to the method described in document [1], however, in order to apply extracted information, not only is error diffusion low-pass filtering required, but also other filtering must be performed in a quantizer and an output unit, so that the number of calculations is increased.

According to another method [2] proposed by Wong ("Adaptive error diffusion and its application in multi-resolution rendering," P. W. Wong, IEEE Trans. Image Processing, vol. 5, No. 7, pp. 1184–1196, 1996), in accordance with an input/output image, an error diffusion filter is adaptively changed based on a local distortion criterion. When the method described in document [2] is used to adjust distortions of all the coefficients of the diffusion low-pass filter, however, based on the impulse response of a human visual characteristic model, a calculation using the least squares method is required for each pixel. Thus, as with the method described in document [1], there is an increase in the number of calculations must be performed.

ADVANTAGES OF THE INVENTION

To resolve the problem presented by method [1], according to the present invention characteristic extraction information and input/output information are simultaneously used to appropriately adjust the error diffusion rate, and to provide the following improved results. Since the error diffusion ratio is adjusted for each pixel by using an algorithm for a trade-off between the characteristic extraction information and the input/output information, an appropriate degree of error diffusion can be provided and a half tone image can be generated that is highly correlated with an input image. Further, since the characteristic extraction information and the input/output information are simultaneously used for the adjustment, filtering by units other than the diffusion filter is not necessary, and a large increase in the number of calculations is not required.

In addition, to resolve the problem encountered with method [2], according to the present invention, not all the coefficients of the error diffusion low-pass filter are adaptively adjusted; instead, the output of the low-pass filter is multiplied by a diffusion ratio adjusted by the algorithm of the invention, so that a large increase in the number of calculations is avoided.

PURPOSES OF THE INVENTION

It is an object of the present invention to provide, a new image halftoning method whereby an input image is transformed into a half tone image without losing the characteristics of the original image, and for which a large number of calculations is not required.

SUMMARY OF THE INVENTION

According to the present invention, provided is an image error diffusion method for changing, an error diffusion ratio relative to the each pixel of an image.

According to one aspect of the present invention, in order to generate a half tone image that highly correlates with an original image without losing the characteristics of the image, first, the characteristics of the input image are extracted, and then, the obtained results and input/output information are used to adjust, for each pixel, the diffusion state of a quantization error.

According to another aspect of the present invention, (1) the adaptation process for a weight coefficient (diffusion ratio) is performed for each pixel to appropriately adjust diffused errors, and an algorithm for the adaptation process that is derived from the differential norm criterion for an input/output signal is so formed that it includes both characteristic extraction information and input/output quantization error information, both of which it trades off; and (2) the output of the error diffusion low-pass filter is multiplied by a weight coefficient that is adjusted for each pixel.

BRIEF DESCRIPTION OF THE FIGURES

The foregoing and other objects, aspects, and advantages will be better understood from the following non limiting detailed description of preferred embodiments of the invention with reference to the drawings that include the following.

DESCRIPTION OF A PREFERRED EMBODIMENT OF THE INVENTION

A gray image is employed as an input image for the following explanation. For a color image, the method of the present invention can also be applied for each RGB signal, or for a signal such as a YIQ signal (a luminance signal and a color difference signal in the NTSC method) that is obtained by a transformation to another color space.

Figure 15:
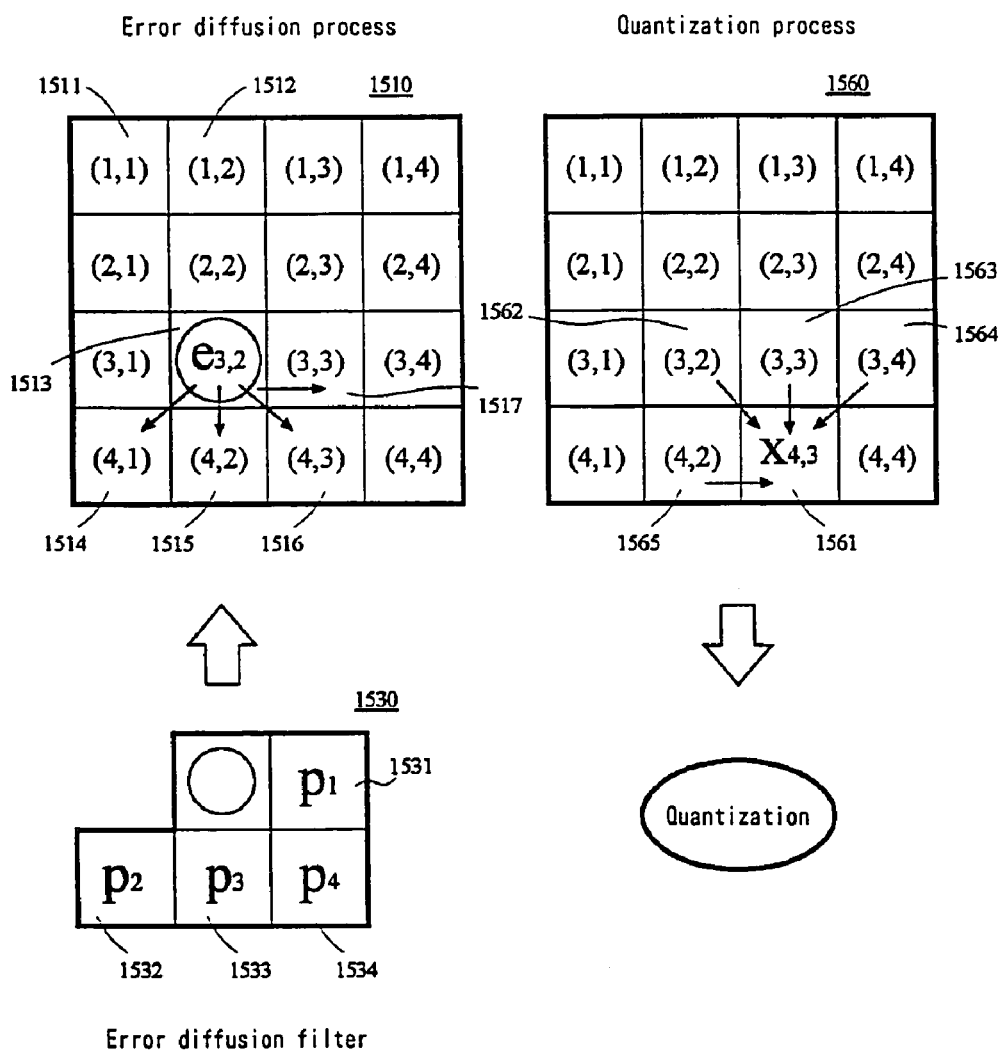
FIG. 15 is a diagram showing the outline of the error diffusion method.

In FIG. 15 the basic idea of the error diffusion method is specifically shown. Assuming that a 4×4 matrix 1510 is an input image, a halftoning is performed by raster scanning toward the direction from element (1,1) 1511 of the matrix to element (1,2) 1512, and when the last column in each row was processed, the halftoning process is returned to the element in the first column of the next row.

If element (3,2) 1513 is now to be processed, as is shown on the left in FIG. 15, the quantization error for the element (3,2) 1513 is diffused to the pixels, 1514 to 1517, in its vicinity. Arrows in the matrix 1510 indicate the flow of the error diffusion. Ratios p1 to p4 (1531 to 1534) for the diffusion to the individual pixels are determined by an error diffusion filter 1530. Since the quantization error is diffused to elements to be processed in this manner, the affect an error has on the half tone image is reduced. This is the outline of the error diffusion method.

In order to obtain an output image, quantization is performed while diffused errors are included in an input image. This process is specifically shown on the right in FIG. 15. Supposing that in a matrix 1560 an element (4,3) 1561 is an element to be quantized, quantization errors from pixels 1562 to 1565 in the vicinity that are to be included in the element (4,3) have previously been determined using the above error diffusion operation. Arrows in the matrix 1560 indicate the flow of the quantization errors to be included. These errors are united in the element (4,3) 1561, and the obtained value is quantized to obtain an output image.

Therefore, it can be said that the performance of the error diffusion method depends greatly on the error diffusion filter that determines how an error should be diffused. For example, according to a conventional, general error diffusion method, an element value p of an error diffusion filter is fixed in advance. Whereas according to the present invention a diffusion ratio is adaptively changed for each pixel in accordance with the local characteristics of an image, i.e., the diffusion ratio is changed for each pixel that is processed, so that a more effective halftoning is performed. Here, the method for the adaptive changing of the diffusion ratio is an operation method that uses an algorithm based on difference information obtained for input/output signals, and that uses terms that include characteristic extraction information and input/output quantization error information.

Figure 1:
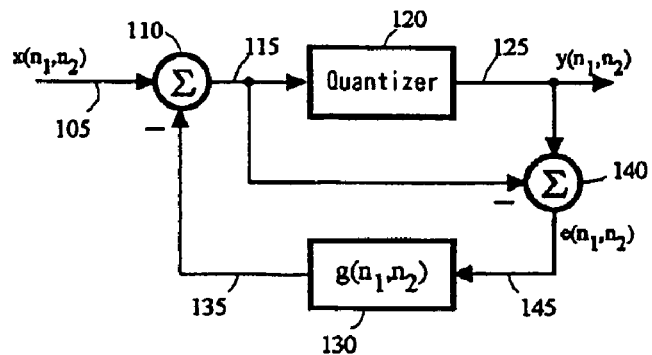
FIG. 1 is a block diagram showing a conventional, general error diffusion method.
Figure 2:
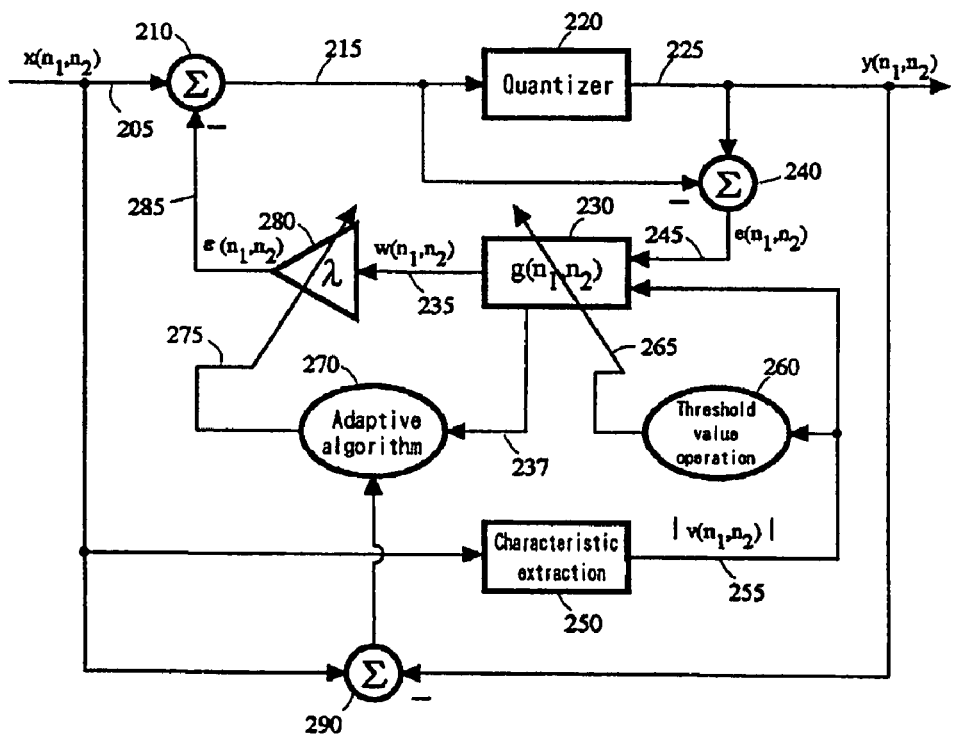
FIG. 2 is a block diagram illustrating a first embodiment according to the present invention.

FIG. 2 is a schematic block diagram showing the arrangement of the present invention. First, characteristic extraction means 250 extracts the characteristics of an input image $x(n_1,n_2)$ 205, and an output signal $|v(n_1,n_2)|$ ★ 255 is obtained.

In FIG. 2, blocks 210, 240 and 290 are adders; a block 220 is a quantizer; a block 230 is error diffusion filter means; a block 250 is characteristic extraction means; a block 260 is threshold value operation means; a block 270 is adaptive algorithm means; and a block 280 is weight coefficient adjustment means.

In the characteristic extraction process, a high frequency component signal, which includes contrast or edge information, is extracted. For example, such a signal is the output of a high-pass filter, such as a Laplacian filter, a Zovel filter, or a quadratic Volterra filter which is proposed in document [3] ("A General Framework For Quadratic Volterra Filters For Edge Enhancement," S. Thurnhofer and S. K. Mitra, IEEE Trans. Image Processing, Vol. 5, No. 6, pp. 950–962, 1996), or the output of a differential operator.

Here, the Laplacian filter is a filter that uses the secondary differential and has no directivity, and the Zovel filter is a filter that uses the primary differential calculation and is effective for edge detection in the horizontal and vertical directions. In addition, the quadratic Volterra filter is a filter that is expressed by development of the Volterra series as an extension of the Taylor series and that has a secondary Volterra kernel as an impulse response.

The threshold value operation means 260 performs a threshold value operation for the output of the characteristic extraction means 250, $|v(n_1,n_2)|$ 255, and a weight coefficient $\lambda(n_1,n_2)$ 280 is used to diffuse the quantization error $e(n_1,n_2)$

245, as in the following expression. The method used to adjust the weight coefficient will be described later.

if $|v(n_1,n_2)|>$Threshold (Threshold value)

$$\varepsilon(n_1, n_2) = |\lambda(n_1, n_2)| \left( \frac{e(n_1, n_2)}{|v(n_1, n_2)|} * g(n_1, n_2) \right)$$

else $$\epsilon(n_1,n_2)=e(n_1,n_2)*g(n_1,n_2)$$

Here, "*" represents a two-dimensional convolution. A filter $g(n_1,n_2)$ is a causal, two-dimensional low-pass filter that, like the one explained for the prior art, is used for the normal error diffusion method. However, the filter g is not thus limited.

In order to appropriately adjust an error to be diffused, an adaptation of the weight coefficient $\lambda(n_1,n_2)$ is performed in this invention (280). In this process, not only is a dynamic adjustment made using the characteristic extraction information, but also appropriate error diffusion is performed using the input and output image information in the adaptive algorithm 270. For this purpose, the adaptive algorithm 270 is obtained by using the H2 norm criterion of a difference between the input/output signals, $\{x(n_1,n_2)-y(n_1,n_2)\}$, and a weight coefficient corresponding to the error diffusion ratio is adjusted for each pixel.

The following expression is used as the least squares error criterion to obtain the adaptive algorithm.

$$E[\{x(n_1,n_2)-y(n_1,n_2)\}^2]$$

Here, E[ ] represents the expectation operator. The expectation operator is a mean operation.

The following adaptive algorithm is proposed based on the above criterion.

$$\lambda(n_1,n_2)=\lambda(n_1,n_2-1)-\mu w(n_1,n_2)\{x(n_1,n_2)-y(n_1,n_2)\}$$

if $|v(n_1,n_2)|>$Threshold (Threshold value)

$$w(n_1, n_2) = \left( \frac{e(n_1, n_2)}{|v(n_1, n_2)|} * g(n_1, n_2) \right)$$

else $$w(n_1,n_2)=e(n_1,n_2)*g(n_1,n_2)$$

Here, $\lambda$ is updated in the raster scanning order, and $\mu$ is a small positive value, such as 0.0001.

This algorithm is similar in form to the conventional LMS algorithm, but differs from the conventional LMS algorithm obtained by directly performing a partial differential calculation to the above described error criterion.

Here, the LMS algorithm is a least mean squares algorithm.

Since a non-linear process, such as quantization, is included in the error criterion, in the process for acquisition of the adaptive algorithm, a method such as alternating a quantization error with $\epsilon(n_1,n_2)$ is used as needed.

The present invention is not limited to the pre-described norm or to the pre-described form of the adaptive algorithm. For example, the H1 norm or H $\infty$ norm may be used in the norm criterion. However, as the effect provided by the present invention, the adaptive algorithm is one wherein both characteristic extraction information and input/output quantization error information are included, while the difference norm of the input/output information is used as a criterion, and with which the diffusion ratio is adjusted by trading off the two information items. In the present invention, there is no essential difference in the norm criterion and the change in the form of the algorithm.

The processing performed using the adaptive algorithm of the present invention will now be described. When the value of the characteristic extraction information is large, the error diffusion provided by the error diffusion filter is restricted. However, when the error between the input/output signals is also large, in the present invention the weight coefficient is adjusted by trading off the characteristic extraction information and input/output error information.

That is, the second term on the right side of the algorithm for the weight coefficient $\lambda(n_1,n_2)$ is so formed that it controls the change in the weight coefficient using the characteristic extraction information value, and reflects the magnitude of the error between the input/output signals. Similarly, when the input/output error is large while the characteristic extraction information value is normal, or when the input/output error is small while the characteristic extraction information value is large, the weight coefficient is adjusted by trading off the two information items. Therefore, according to the method of the present invention, a half tone image that is highly correlated with an input image is generated without losing characteristics of the image.

Since the method of the present invention uses the characteristic extraction result $v(n_1,n_2)$ and input information $x(n_1,n_2)$, and output information $y(n_1,n_2)$, in order to adjust the error diffusion ratio, the filtering, performed, as in document [1], in the quantizer and the output unit in order to use the characteristic extraction results, is not required, and an increase in the number of calculations can be prevented. Further, according to the present invention, unlike document [2], not all the diffusion filter coefficients are adjusted but the output of the diffusion filter obtained through the threshold value process is multiplied by $\lambda(n_1,n_2)$, adjusted for each pixel. Thus, an increase in the number of calculations is prevented.

Since the number of calculations required for the above adaptive algorithm is smaller than that required for the filtering, the number of calculations is only about one third that in document [1]. Although in document [2] the number of calculations varies, depending on the local characteristics of the image, apparently the number of calculations of the present invention is at least reduced until it is equal to or smaller than a value obtained by dividing one by a number equivalent to the number of non-zero coefficients for the diffusion low-pass filter, even if a specific numerical comparison is difficult. Furthermore, while taking into account that in document [2] the Bessel function is calculated and an estimated parameter is obtained by performing a large number of calculations, the present invention requires only several tenths the number of calculations required for document [2].

Figure 3:
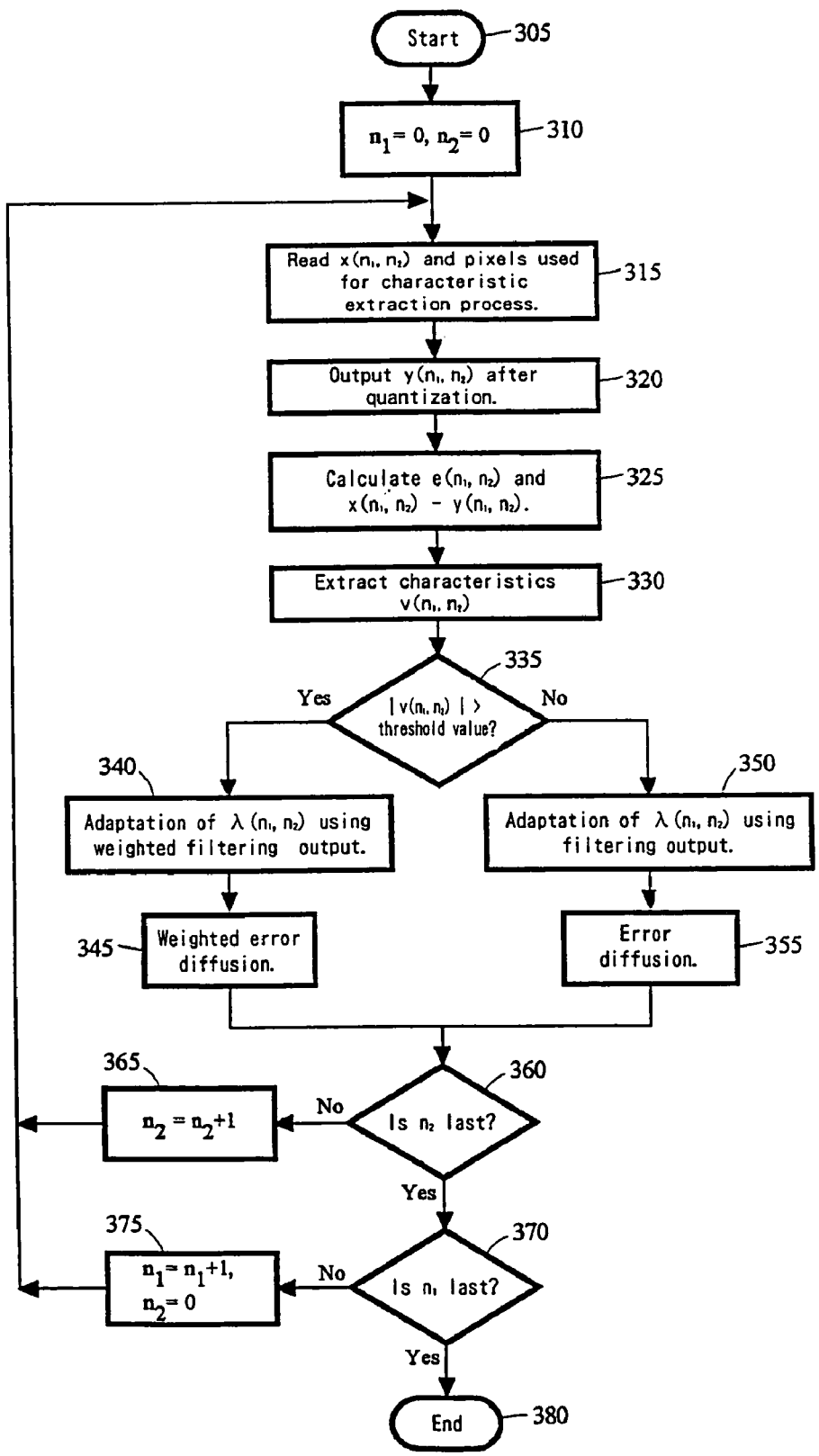
FIG. 3 is a flowchart showing the processing performed according to the first embodiment of the present invention.

FIG. 3 is a flowchart showing the main processing performed for the first embodiment in FIG. 2. First, at step 310, the coordinates that represent a pixel to be processed are initialized.

At step 315, pixel $x(n_1,n_2)$, of the current image to be currently processed, and pixels required for the extraction of characteristics are read. The pixels required for the extraction of characteristics are those used for characteristic extraction calculations, such as the four pixels present in the upper, lower, right and left positions of the pixel $x(n_1,n_2)$. In addition, the pixels to be processed are changed in accordance with the characteristic extraction calculation that is used.

At step 320, quantization is performed to obtain output $y(n_1, n_2)$. The quantization is a transformation process for using a small number of bits, such as one bit, to obtain an approximation of an input signal represented by, for example, 8 bits.

At step 325, the errors $e(n_1,n_2)$, and $x(n_1,n_2)-y(n_1,n_2)$ are calculated.

At step 330, the extraction of characteristics is performed by the high-pass filter or the differential operator to obtain the characteristic extraction results $v(n_1,n_2)$.

At step 335, a check is performed to determine whether absolute value $|v(n_1,n_2)|$ of the characteristic extraction results is greater than a threshold value. When the absolute value is greater than the threshold value, error $e(n_1,n_2)$ is divided by $|v(n_1,n_2)|$, filtering is performed by convolution of the obtained result and the diffusion filter $g(n_1,n_2)$, and weight coefficient $\lambda(n_1,n_2)$ is updated (step 340). Error diffusion is then performed by using the updated weight coefficient $\lambda(n_1,n_2)$ (step 345).

When, at step 335, the absolute value of the characteristic extraction result is equal to or smaller than the threshold value, filtering is performed by convolution of the error $e(n_1,n_2)$ and the filter $g(n_1,n_2)$, and the weight coefficient $\lambda(n_1,n_2)$ is updated (step 350). The normal error diffusion is then performed (step 355).

At step 360, a check is performed to determine whether the current column is the last in the raster scanning order. If the current column is not the last one, $n_2$ is incremented (step 365), and program control thereafter returns to step 315. If the current column is the last one, program control advances to step 370.

At step 370, a check is performed to determine whether the current row is the last row. If the current row is not the last one, $n_1$ is incremented, and $n_2$ is initialized (step 375). If at step 370 the current row is the last one, the processing is terminated (step 380).

FIGS. 4A to 4C are diagrams showing half tone images obtained by performing a halftoning for a specific image using the method of the present invention and two others. The used methods are: (a) a normal error diffusion method 410; (b) an error diffusion method 420 (a method for which only characteristic extraction information obtained using a quadratic Volterra filter is used) described in document [4] ("Nonlinear Detail Enhancement Of Error-diffused Images," S. Thurnhofer and S. K. Mitra. Proc. SPIE Conf. Human Vision, Visual Processing And Digital Display V, Vol. 2179, pp. 170–181, February, 1994); and (c) a method according to the present invention 430.

An input image used for FIGS. 4A to 4C had a resolution of 256×256, and had 256 gray levels. The images in FIGS. 4A to 4C, which were obtained by half tone transformation, have a resolution of 256×256, and two gray levels (white and black).

Figure 4:
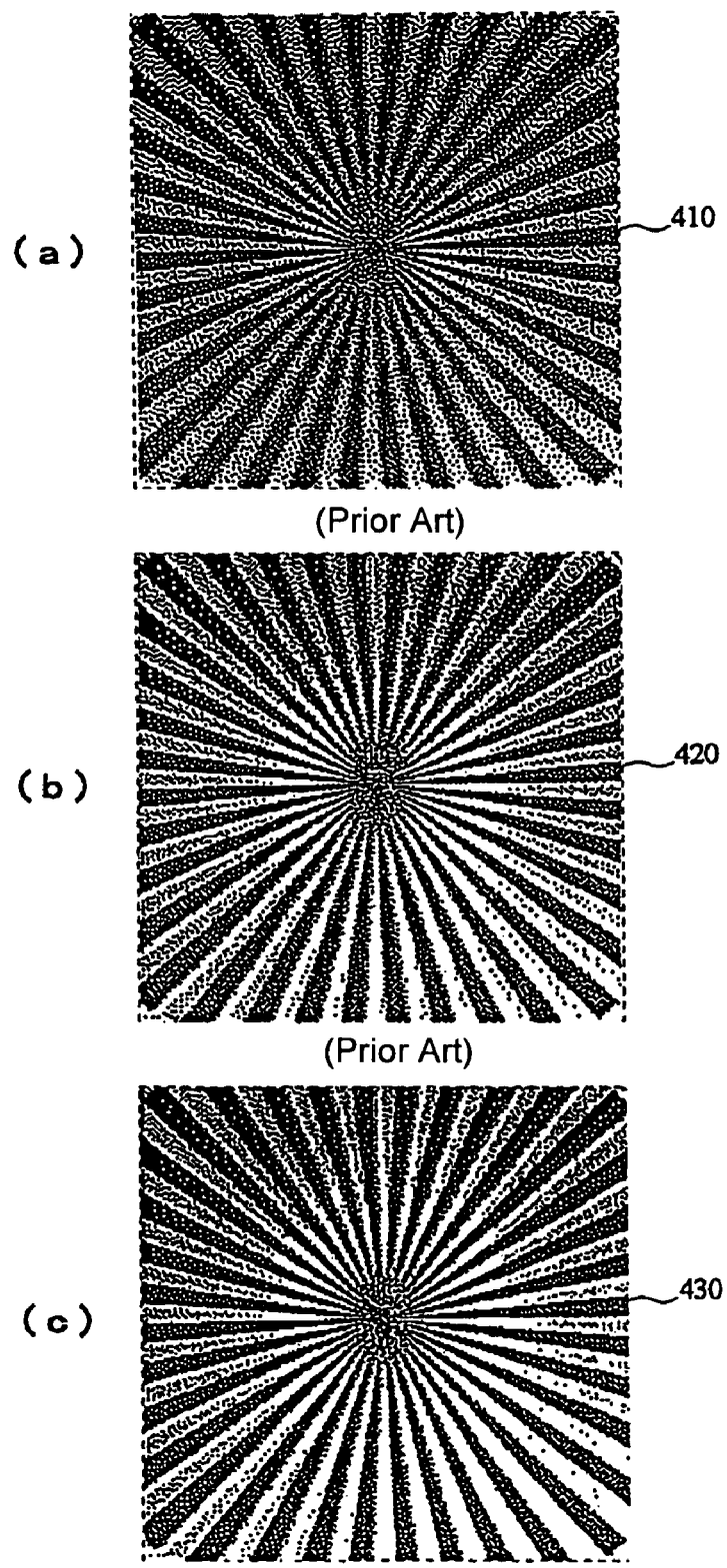
FIGS. 4A to 4C are diagrams showing image examples 1 obtained when the method of the present invention and conventional methods were employed for a real image.

As can be easily understood from a comparison of the three images in FIGS. 4A to 4C, in the half tone image in FIG. 4C, obtained using the method of this invention, the characteristics of the detailed portions are retained. Actually, the effect is more easily discerned when the image is viewed on a display device, such as an LCD (Liquid Crystal Display), rather than when it is provided as a printed drawing, as in FIG. 4.

Generally, a correlation value and an MSE value (mean square error) are used as the objective evaluation index for a half tone image. The correlation value and the MSE value ($\times 10^4$) for the images in FIGS. 4A to 4C are shown in Table 1.

TABLE 1

|  | (a) Error diffusion method | (b) Method in document [4] | (c) Present invention |
|---|---|---|---|
| Correlation value | 0.6068 | 0.6969 | 0.7370 |
| MSE value | 1.0323 | 0.87975 | 0.81146 |

The correlation value represents the degree of statistic correlation between an original image and a half tone image, and is calculated using the following expression. Note that when an image is evaluated a higher correlation value is better.

$$r = \frac{1}{\sigma_x \sigma_y} \cdot \frac{1}{N_1 N_2} \sum_{n_1=1}^{256} \sum_{n_2=1}^{256} (x(n_1, n_2) - \mu_x) \cdot (y(n_1, n_2) - \mu_y),$$

$$\sigma_i = \sqrt{\frac{1}{N_1 N_2} \sum_{n_1=1}^{256} \sum_{n_2=1}^{256} (i(n_1 - n_2) - \mu_i)^2},$$

$$\mu_i = \frac{1}{N_1 N_2} \sum_{n_1=1}^{256} \sum_{n_2=1}^{256} i(n_1, n_2),$$

wherein $i \in \{x,y\}$

The MSE value is a value obtained by calculating for each pixel the square of a difference between the original image and the half tone image, and by dividing, by the number of pixels, the sum of the squares. When an image is evaluated a smaller MSE value is better.

While referring to Table 1, according to the error diffusion method 410 in FIG. 4A, the correlation value is 0.6068 and the MSE value is $1.0323 \times 10^4$.

According to the error diffusion method 420 in FIG. 4B, which is described in document [4], the correlation value is 0.6969 and the MSE value is $0.87975 \times 10^4$.

According to the error diffusion method 430 in FIG. 4C, performed in accordance with the present invention, the correlation value is 0.7370 and the MSE value is $0.81146 \times 10^4$.

By comparing the results obtained for the three methods in FIGS. 4A to 4C, it can be seen that for the image prepared using this invention the correlation value is the largest and the MSE value is the smallest. And thus it is apparent that the quality of the half tone image obtained using the method of this invention is the highest.

The quadratic Volterra filter mentioned in document [4] is used as characteristic extraction means for the method of this invention.

Here, the quadratic Volterra filter is a filter that is expressed by development of the Volterra series, which is an extension of the Taylor series, and that has a secondary Volterra kernel as an impulse response.

Figure 5:
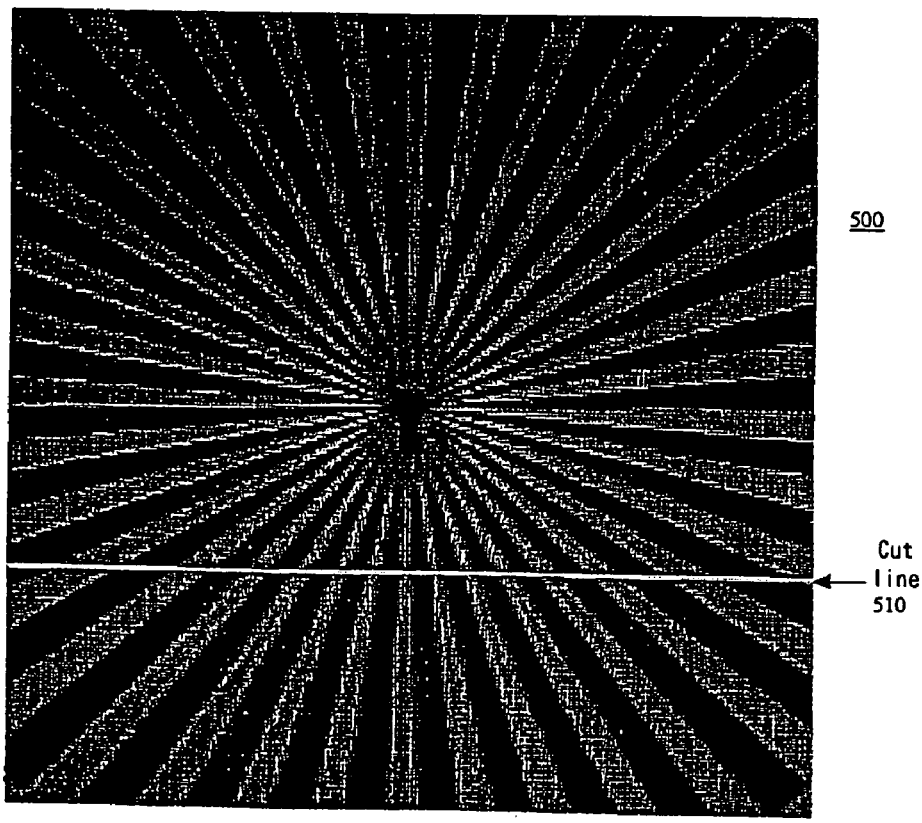
FIG. 5 is a diagram showing the input image that is used for FIGS. 4A to 4C.
Figure 6:
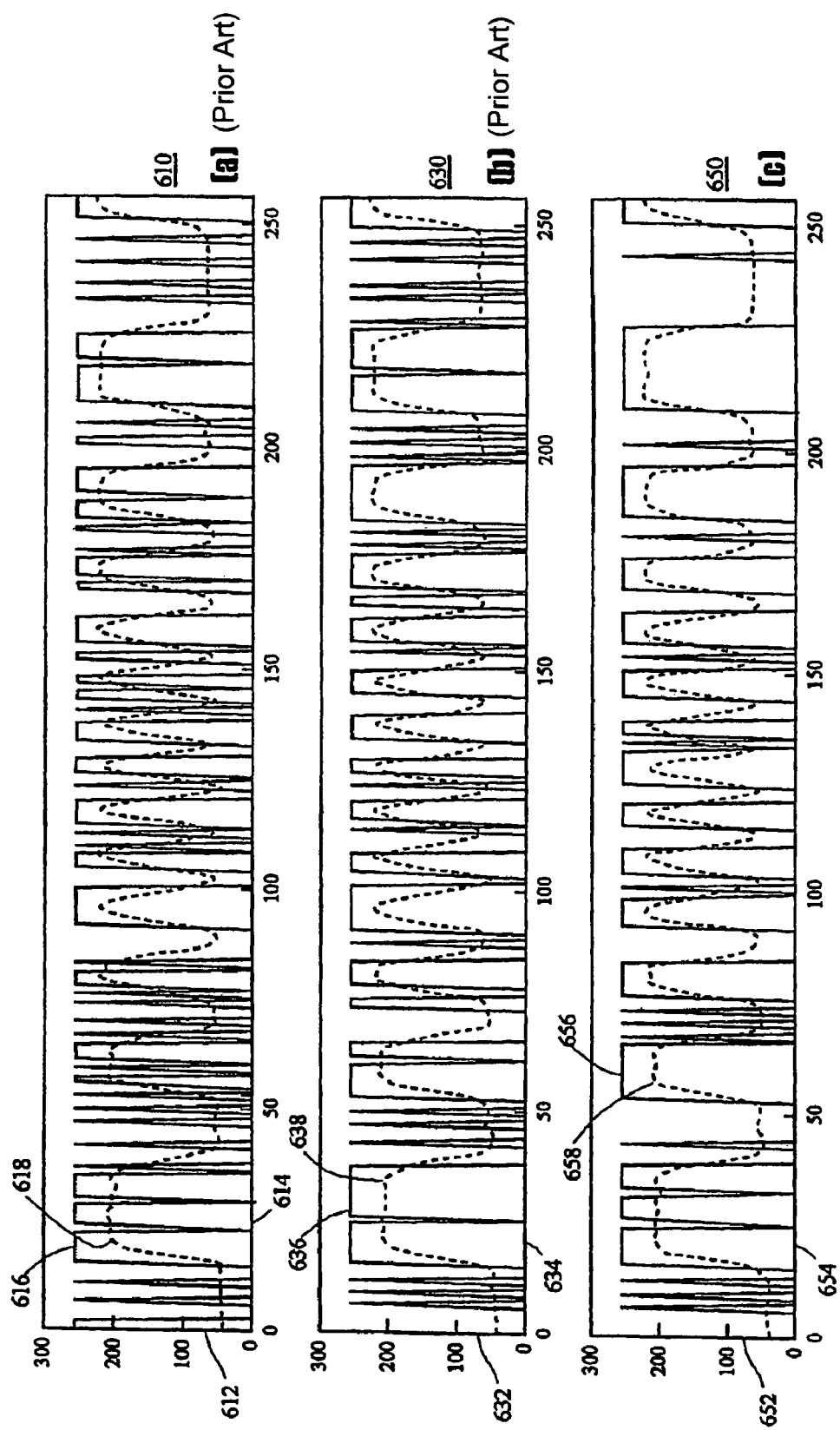
FIGS. 6A to 6C are diagrams showing partial data taken from the images in FIGS. 4A to 4C.

The values (solid lines) obtained by cutting the images in FIGS. 4A to 4C along a line 510 in FIG. 5 are shown in FIGS. 6A to 6C, together with the value (broken line) of the original image shown in FIG. 5.

It is apparent that the result 650, shown in FIG. 6C, obtained using the method of this invention expresses the original image better than the results 610 in FIGS. 6A and 630 in FIG. 6B.

In FIGS. 6A to 6C, the vertical axis represents a pixel value (1 or 0 gray level for the solid line, and 256 gray levels for the broken line), and the horizontal axis represents the coordinate axis for an image (for each pixel). It is understood that, for example, in the interval between 200 and 250, along the coordinate axis the high correlation of the solid line and the broken line can be obtained in accordance with the method of this invention, as shown in FIG. 6C.

In the interval 225 to 250 along the horizontal axis, according to the methods shown in FIGS. 6A and 6B, four or five spike-shaped solid lines appear at the portion where the pixel value indicated by the broken line is low. On the other hand, according to the method of this invention 650 in FIG. 6C, only one spike-shaped solid line appears in the interval 225 to 250. Therefore, the method of this invention in FIG. 6C is superior to the conventional methods in FIGS. 6A and 6B. Further, it is understood that in the other areas along the horizontal axis, unwanted spiked shapes do not appear, and the solid line follows the broken line well.

Figure 7:
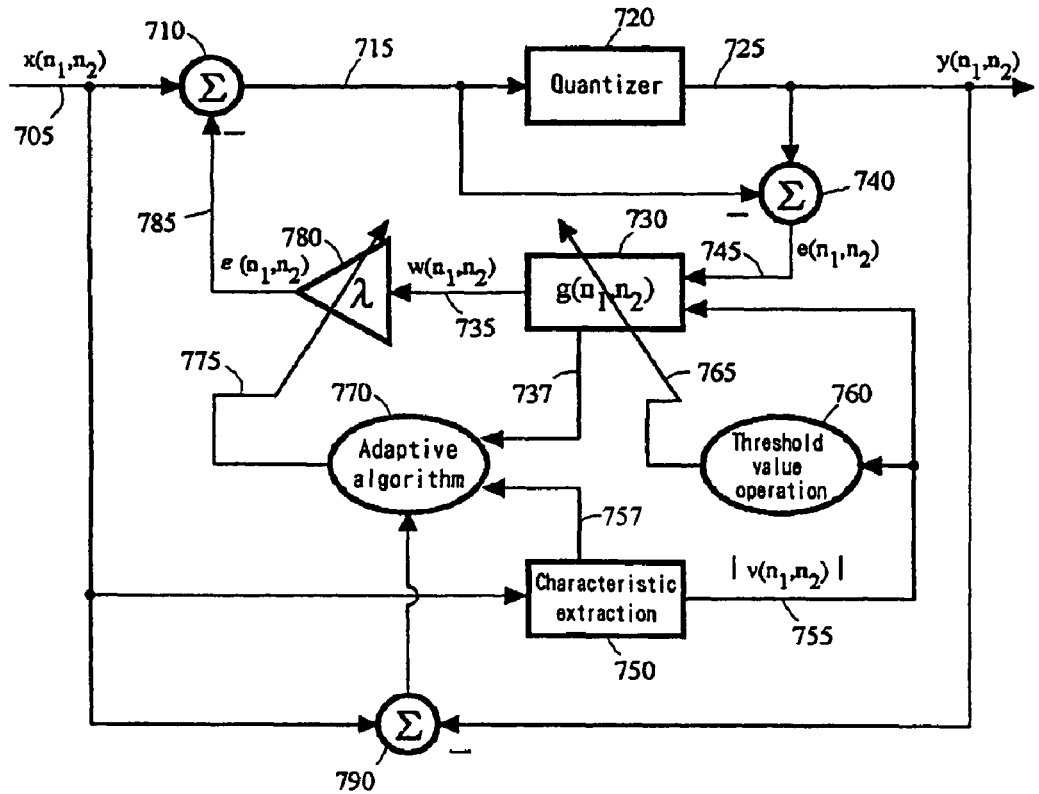
FIG. 7 is a block diagram illustrating a second embodiment according to the present invention.

FIG. 7 is a diagram showing a second embodiment that differs from the embodiment in FIG. 2. In the second embodiment in FIG. 7, a method is used for changing a step coefficient based on characteristic extraction output. In this embodiment, in order to adapt the step coefficient that is fixed in the first embodiment method, the step coefficient may be adjusted based on the characteristic extraction information similar to the threshold value operation. Therefore, an input line 757 extending from characteristic extraction means 750 to adaptive algorithm means 770 is additionally provided.

According to the method in the second embodiment in FIG. 7, compared with the first embodiment the number of calculations is slightly increased; however, this method is appropriate for a process for handling an image having many detailed portions.

Figure 8:
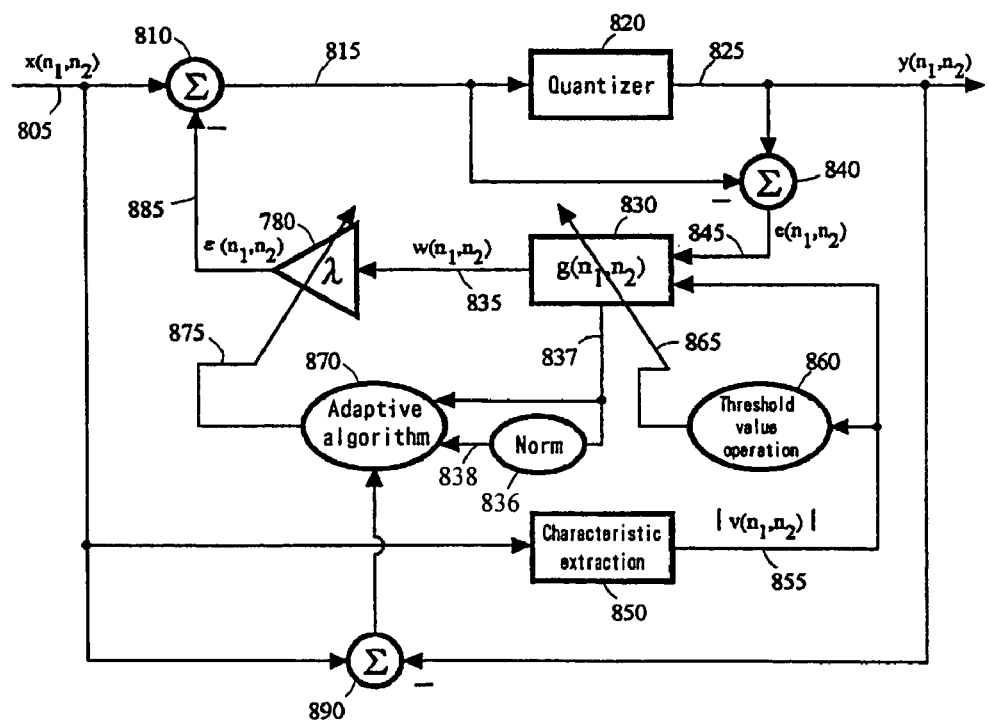
FIG. 8 is a block diagram illustrating a third embodiment according to the present invention.

FIG. 8 is a diagram showing a third embodiment that differs from the first embodiment in FIG. 2. In the third embodiment, a norm 890 is also used in an adaptive algorithm 870. A norm calculation block 836 is additionally connected to an output terminal 837 of a filter $g(n_1, n_2)$, and an output terminal 838 of the norm calculation block 890 is connected to the input terminal of adaptive algorithm means 870.

In the third embodiment, an image having the same quality as that in the first embodiment can be obtained using the same number of calculations.

Figure 9:
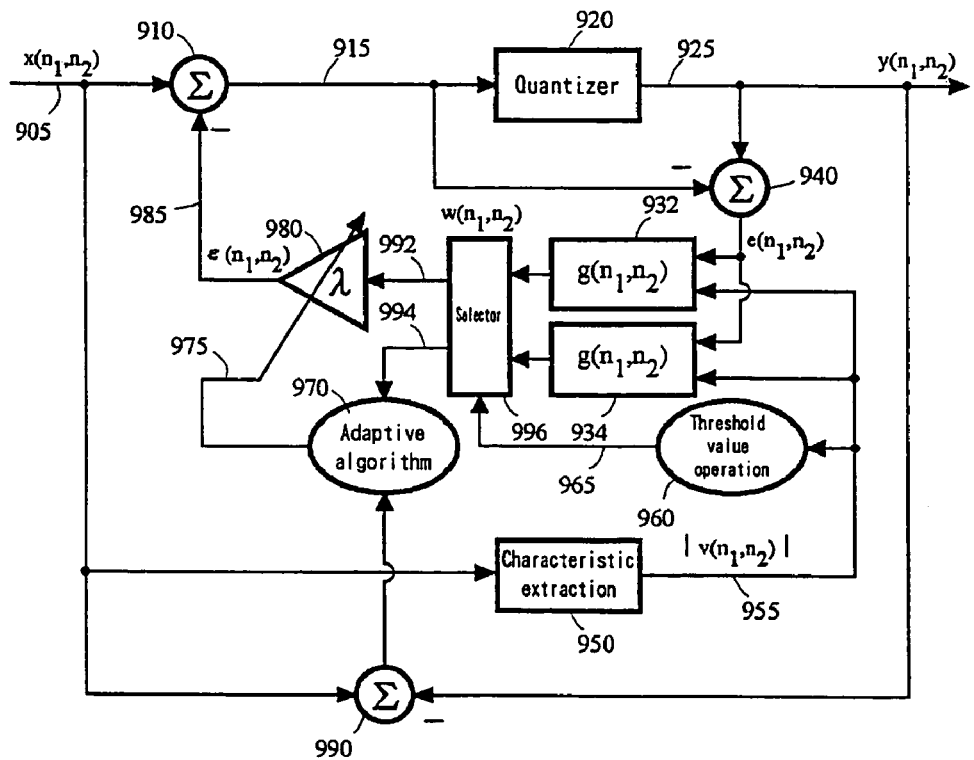
FIG. 9 is a block diagram illustrating a fourth embodiment according to the present invention.

FIG. 9 is a diagram showing a fourth embodiment that differs from the first embodiment in FIG. 2. In the fourth embodiment, a diffusion filter is divided into a plurality of filters 932 and 934. While the threshold operation means 960 sorts the filtered output in the first embodiment in FIG. 2, here, the filters 932 and 934 are prepared and the outputs therefrom are controlled in accordance with characteristic extraction results 955 (the outputs are selected or are mixed). In FIG. 9, the diffusion filter 230 in FIG. 2 is split to obtain two filters, but it may be divided into three or more filters.

The arrangement for the fourth embodiment in FIG. 9 can be implemented using hardware easier than that for the first embodiment.

Figure 10:
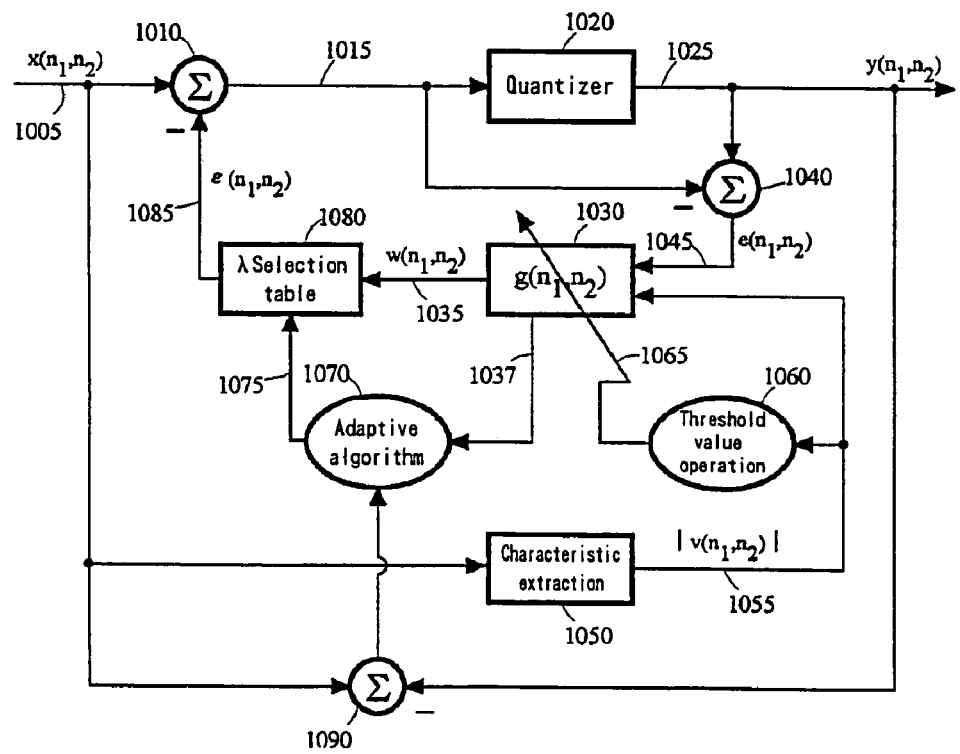
FIG. 10 is a block diagram illustrating a fifth embodiment according to the present invention.

FIG. 10 is a diagram showing a fifth embodiment that differs from the first embodiment in FIG. 2. In the fifth embodiment, changes for λ are limited to several predetermined values. While in the first embodiment in FIG. 2 the value of λ is adapted by obtaining sequential values (280), in this embodiment, several values are determined in advance, and the value of λ is selected from these limited values in accordance with results 1075 provided by an adaptive algorithm 1070. Therefore, the variable multiplication block 280 in FIG. 2 is replaced by a λ selection table 1080.

The arrangement in the fifth embodiment in FIG. 10 is more appropriate than the first embodiment for the process for handling irregular images.

Figure 11:
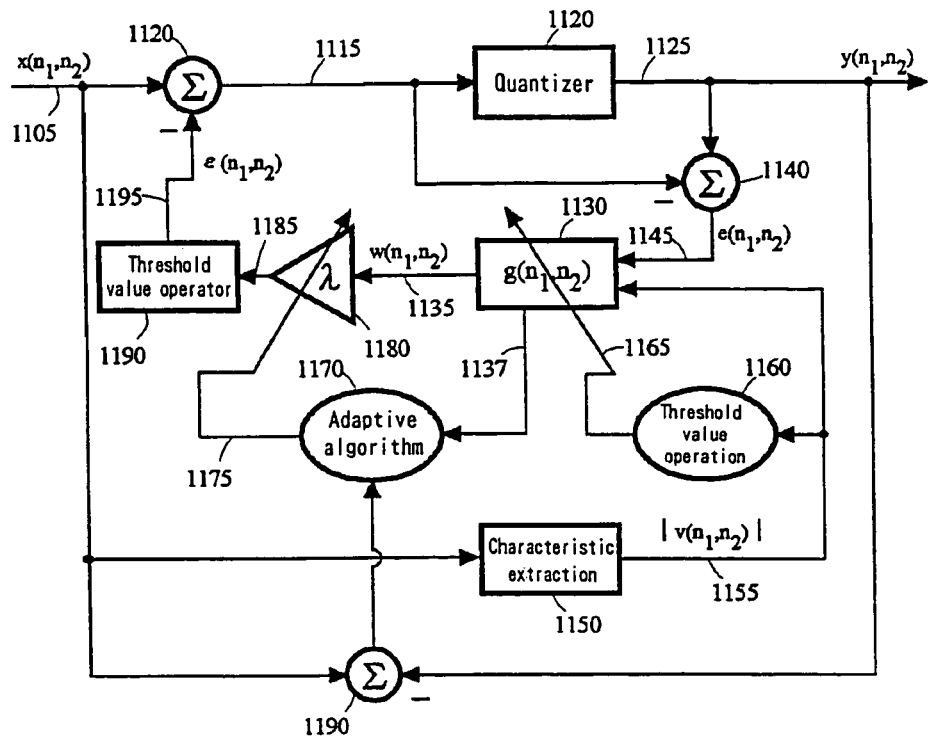
FIG. 11 is a block diagram illustrating a sixth embodiment according to the present invention.

FIG. 11 is a diagram showing a sixth embodiment that differs from the first embodiment in FIG. 2. In the sixth embodiment, a threshold value is provided for the upper and lower limits of the values for λ. The upper and lower limits can be provided in the case that the value λ is continuously adapted, and a threshold value operator 1190 is additionally provided in the block diagram in FIG. 2.

In the sixth embodiment in FIG. 11, the same number of calculations are required as in the first embodiment. Since the value λ is not divergent, the method in the sixth embodiment is appropriate for the process for handling an artificial image wherein a monotonous background image suddenly appears during a gradation change.

Figure 12:
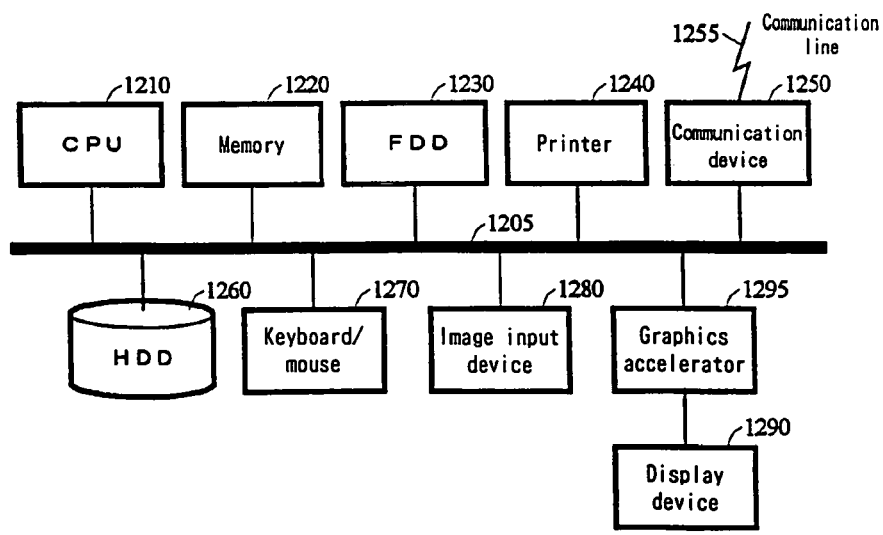
FIG. 12 is a block diagram illustrating a computer system that is appropriate for carrying out the present invention.

The processing for this invention can be carried out by a computer program. This computer program can be executed by a computer system shown in FIG. 12, for example. In FIG. 12, the computer program and necessary data are stored on a hard disk drive (HDD) 1260, are loaded into a main memory 1220 as needed, and are executed by a CPU 1210. The results obtained by the processing (including intermediate data) are also stored in the main memory 1220. It should be noted that the results may be virtually stored on the HDD 1260. The data can be supplied through a keyboard or a mouse 1270, from a floppy disk drive (FDD) 1230 or another storage medium, or along a communication line 1255 connected to a communication device 1250, such as a modem. The computer program may be received from another computer system, or it may be provided by using the FDD 1230, a CD-ROM, or another storage medium. In this invention, the results obtained by the processing are used for numerical analysis by another computer program stored on the HDD 1260. In addition, the results can be provided for a user by a graphics accelerator 1295, a display device 1290 or a printer 1240, and an image can be input by an image input device 1280, such as a scanner or a digital camera.

Figure 13:
FIG. 13 is a diagram showing image example 2 obtained when the conventional method was employed for a real image.
Figure 14:
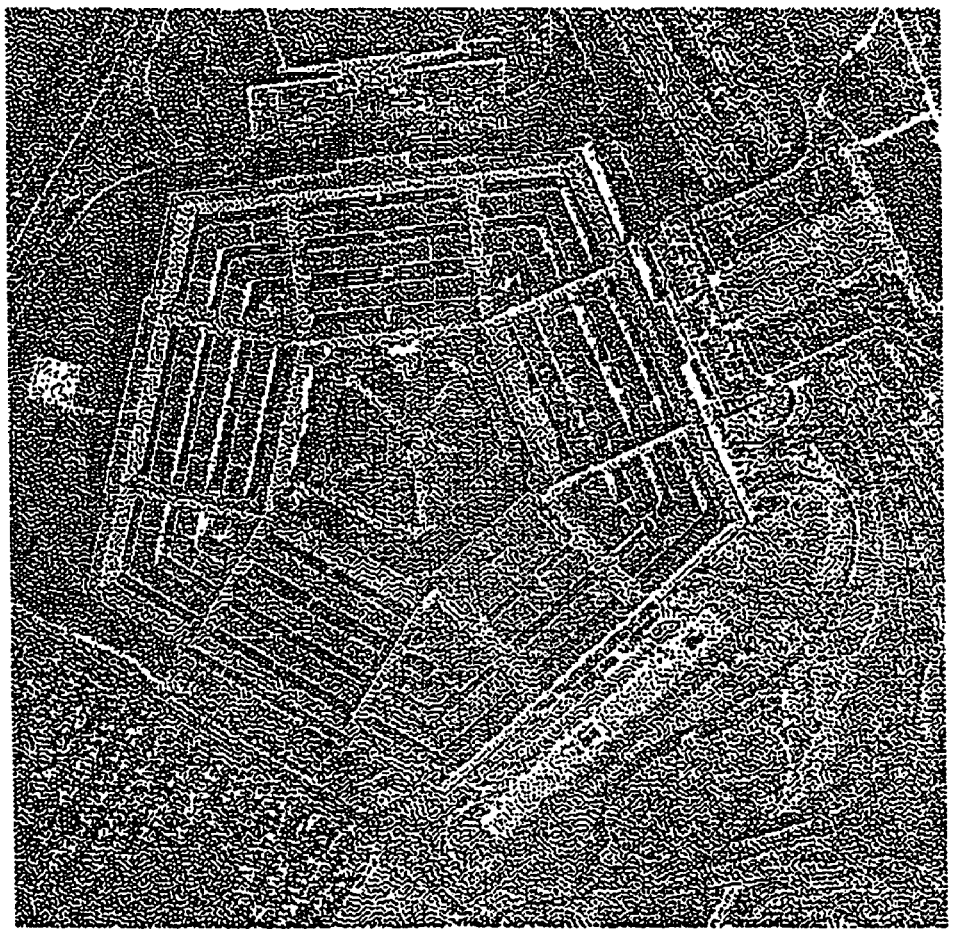
FIG. 14 is a diagram showing image example 2 obtained when the method of this invention was employed for a real image.

FIGS. 13 and 14 are diagrams showing half tone images obtained by using the method of this invention and another method to transform a specific image that differs from the one in FIG. 4. The used methods are the normal error diffusion method (FIG. 13) and the method of this invention (FIG. 14).

An input image used for the methods in FIGS. 13 and 14 has a resolution of 512×512 and 256 gray levels. The input image is a representation of the building housing the United States Department of Defense and its periphery. The images (FIGS. 13 and 14) obtained by half tone transformation have a resolution of 2048×2048 and two gray levels. For convenience sake, the input image was enlarged four times.

Apparently, the image (FIG. 14) obtained by using the method of this invention is superior to the image (FIG. 13) obtained using the normal error diffusion method. Compared with the image in FIG. 13, the outline of the Department of Defense building in FIG. 14 is clearly distinguishable, as are the outlines of the peripheral roads.

According to the error diffusion method used in FIG. 13, the correlation value is 0.2860 and the MSE value is $1.5038 \times 10^4$. According to the method of the present invention used in FIG. 14, the correlation value is 0.3435 and the MSE value is $1.4570 \times 10^4$.

Since the correlation value for FIG. 14 is greater than that for FIG. 13, and the MSE value for FIG. 14 is smaller, from a comparison of these two evaluation indexes it can be seen that the quality of the half tone image obtained using the method of the present invention is higher than that obtained using the normal diffusion method.

Here, the quadratic Volterra filter mentioned in document [4] was used for the characteristic extraction means used by the method of the present invention.

ADVANTAGES OF THE INVENTION

With the above described arrangements of the present invention, a new image halftoning method is provided whereby a half tone image can be generated without losing the characteristics of an original input image, and for which the number of calculations required for such a transformation is not greatly increased.

Therefore, since according to the present invention the characteristic extraction information and the input/output information for the original image can, unlike the prior art, be used to adaptively adjust the error diffusion ratio for each pixel, the method and the system can be implemented, and a half tone image can be generated that is highly correlated with an input image, without greatly increasing the number of calculations that are required.

As a concluding entry, descriptions of various other embodiments are given.

(1) An error diffusion method for an image, whereby an error diffusion ratio is changed for each pixel.

(2) An error diffusion method for an image, whereby an error diffusion ratio is changed for each pixel based on an input image.

(3) An error diffusion method for an image, whereby an error diffusion ratio is changed for each pixel based on an input image and an output image.

(4) An error diffusion method for an image, whereby an error diffusion ratio is changed for each pixel based on an input image, an output image, and the results obtained by the extraction of input image characteristics.

(5) An error diffusion method for an image, whereby, when the result obtained by the extraction of input image characteristics is greater than a threshold value for each pixel, an error diffusion ratio is changed for each pixel.

(6) An error diffusion method for an image, whereby, when the result obtained by the extraction of input image characteristics is greater than a threshold value for each pixel, an error diffusion ratio is changed for each pixel based on the input image.

(7) An error diffusion method for an image, whereby, when the result obtained by the extraction of input image characteristics is greater than a threshold value for each pixel, an error diffusion ratio is changed for each pixel based on the input image and an output image.

(8) An error diffusion method for an image, whereby, when the result obtained by the extraction of input image characteristics is greater than a threshold value for each pixel, an error diffusion ratio is changed for each pixel based on the input image, an output image, and the results obtained by the extraction of the input image characteristics.

(9) An error diffusion apparatus for an image, comprising means for changing an error diffusion ratio for each pixel.

(10) An error diffusion apparatus for an image, comprising means for changing an error diffusion ratio for each pixel based on an input image.

(11) An error diffusion apparatus for an image, comprising means for changing an error diffusion ratio for each pixel based on an input image and an output image.

(12) An error diffusion apparatus for an image, comprising means for changing an error diffusion ratio for each pixel based on an input image, an output image, and the results obtained by the extraction of input image characteristics.

(13) A computer for performing an error diffusion for an image, comprising: a processor; a memory; a nonvolatile storage device; and means for changing an error diffusion ratio for each pixel.

(14) A recording medium on which is stored a program for performing an error diffusion method for an image, the program comprising a step of changing an error diffusion ratio for each pixel.

(15) An error diffusion apparatus for an image, comprising: a quantizer; an adder; characteristic extraction means; and an error diffusion filter, wherein, when a characteristic extraction result that the characteristic extraction means obtains from an input image is greater than a threshold value, an error diffusion ratio is changed for each pixel.

DESCRIPTION OF THE SYMBOLS

110, 140, 210, 240, 290: Adder
120, 220: Quantizer
130, 230: Error diffusion filter
250: Characteristic extraction means
260: Threshold value operation means
270: Adaptive algorithm means
280: Weight coefficient adjustment means
1210: CPU
1220: Memory
1230: FDD
1240: Printer
1250: Communication device
1255: Communication line
1260: HDD
1270: Keyboard, Mouse
1280: Image input device
1290: Display device
1295: Graphics accelerator While the invention has been described in terms of preferred embodiments, those skilled in the art will recognize that the invention can be practiced with modification within the spirit and scope of the appended claims.

I claim:

1. An error diffusion method for an image comprising:
    extracting image characteristics from an input image;
    changing an error diffusion ratio for each pixel responsive to extracted said image characteristics;
    wherein when extracted said image characteristics of an input image are greater than a threshold value for a pixel, said error diffusion ratio is changed for said pixel based on said input image; and
    wherein below said threshold, a quantization error ($e(n1, n2)$) is low pass filtered ($g(n1,n2)$), said low pass filtered quantization error being said error diffusion ratio for said pixel.

2. An error diffusion method for an image as in claim 1 wherein said error diffusion ratio for each pixel is further changed based on an input image.

3. An error diffusion method for an image as in claim 1 wherein said error diffusion ratio for each pixel is further changed based on an input image and an output image.

4. An error diffusion method for an image as in claim 1, wherein when extracted said image characteristics are greater than a threshold value for a pixel, said error diffusion ratio is changed for said pixel.

5. An error diffusion method for an image as in claim 1 wherein extracted said image characteristics comprise contrast and edge information.

6. An error diffusion method for an image as in claim 1, wherein above said threshold, said quantization error ($e(n_1, n_2)$) is divided by the magnitude of said extracted image characteristics ($|v(n_1,n_2)|$) and then low pass filtered ($g(n_1, n_2)$).

7. An error diffusion method for an image as in claim 6, wherein above said threshold, low pass filtered results are weighted, said error diffusion ratio for said pixel being said weighted said low pass filtered results.

8. An error diffusion method for an image as in claim 6, wherein said low pass filtered results are weighted by weights ($\lambda(n_1,n_2)$), determined responsive to said difference.

9. An error diffusion method for an image as in claim 8, further comprising:
   determining a difference between an output image and said input image, said error diffusion ratio being further changed responsive to said difference.

10. An error diffusion apparatus for an image comprising:
    image characteristics extraction means for extracting image characteristics from an input image;
    means for changing an error diffusion ratio for each pixel responsive to said image characteristics extraction from said image characteristics extraction means; and
    comparison means for determining a difference between output image characteristics and the extracted said image characteristics, said error diffusion ratio being further changed responsive to said difference.

11. An error diffusion apparatus for an image as in claim 9, wherein said means for changing said error diffusion ratio for each pixel further changes said error diffusion ratio based on an input image.

12. An error diffusion apparatus for an image as in claim 10, wherein said means for changing said error diffusion ratio for each pixel further changes said error diffusion ratio based on an input image and an output image.

13. An error diffusion apparatus for an image as in claim 10, wherein said image characteristic means is a high frequency filter.

14. An error diffusion apparatus for an image as in claim 13, wherein said high frequency filter extracts contrast and edge information from said input image.

15. An error diffusion apparatus for an image, comprising:
    a quantizer;
    an adder;
    characteristic extraction means;
    an error diffusion filter,
    wherein, when a characteristic extraction result that said characteristic extraction means obtains from an input image is greater than a threshold value, an error diffusion ratio is changed for each pixel; and
    wherein said adder takes a difference between an input image and an output image and said error diffusion ratio is further changed responsive to said difference.

16. An error diffusion apparatus for an image as in claim 15, wherein said characteristic extraction means extracts contrast and edge information from said input image.

17. A computer readable recording medium on which is stored a program for performing an error diffusion method for an image, said program comprising:
    program product means for extracting image characteristics from an input image;
    program product means for changing a pixel error diffusion ratio for image pixels responsive to extracted said image characteristics; and
    program product means for determining a difference between output image characteristics and the extracted said image characteristics, said error diffusion ratio is further changed responsive to said difference.

18. A recording medium on which is stored a program as in claim 17, wherein the program product means for changing said pixel error diffusion ratio further comprises:
    program product means for determining when extracted said image characteristics are greater than a threshold value for a pixel, said error diffusion ratio being changed for said pixel responsive to a determination that extracted said image characteristics are greater for said pixel.

19. A recording medium on which is stored a program as in claim 18, wherein the program product means for determining when said extracted image characteristics are greater than a threshold value further causes said error diffusion to be changed for each pixel based on said input image.

20. A recording medium on which is stored a program as in claim 18, wherein the program product means for determining when said extracted image characteristics are greater than a threshold value further causes said error diffusion to be changed for each pixel based on said input image and an output image.

21. A recording medium on which is stored a program as in claim 17, wherein the program product means for extracting image characteristics extracts contrast and edge information from said input image.

* * * * *